US007059223B1

(12) United States Patent
Arias

(10) Patent No.: US 7,059,223 B1

(45) Date of Patent: Jun. 13, 2006

(54) TOOL TO REPLACE MOTORCYCLE BRAKE PADS

(76) Inventor: William Arias, 13909 SW. 90 Ave., Apt. E101, Miami, FL (US) 33176

( * ) Notice: Subject to any disclaimer, the term of this patent is extended or adjusted under 35 U.S.C. 154(b) by 139 days.

(21) Appl. No.: 10/901,798

(22) Filed: Jul. 30, 2004

Related U.S. Application Data

(63) Continuation-in-part of application No. 10/626,752, filed on Jul. 25, 2003, now Pat. No. 6,862,965.

(51) Int. Cl.
*B05B 11/00* (2006.01)
*B23P 19/04* (2006.01)

(52) U.S. Cl. .......................... 81/485; 29/239; 254/104

(58) Field of Classification Search .................. 81/485; 29/239, 253; 254/485
See application file for complete search history.

(56) References Cited

U.S. PATENT DOCUMENTS 4,809,567 A * 3/1989 Bongard ...................... 81/485
4,903,391 A * 2/1990 Franks ........................ 29/239
5,018,261 A * 5/1991 Markous ...................... 29/239
5,269,053 A * 12/1993 Hicks ...................... 29/402.01

OTHER PUBLICATIONS

U.S. Appl. No. 10/626,752, filed Jul. 25, 2003, Arias, William.

* cited by examiner

*Primary Examiner*—Debra S Meislin
(74) *Attorney, Agent, or Firm*—Sanchelima & Assoc., PA

(57) ABSTRACT

A tool to replace motorcycle brake pads is used for back seating disc brake pistons into their bores to make room for replacement of old brake pads with new brake pads. The tool comprises a pair of curved elongated substantially flat members wedged at both ends that mount onto either side of wheel assembly disc or rotor. Once mounted upon the disc or rotor, the wheel assembly is rotated, causing the wedged ends to slide in between the disc brake pistons and the wheel assembly disc or rotor. This forcing the seating of disc brake pistons into their bores when the plateaued section of the tool is forced between the seating disc brake pistons and the wheel assembly disc or rotor, thus making room for the installation of new brake pads.

6 Claims, 5 Drawing Sheets

TOOL TO REPLACE MOTORCYCLE BRAKE PADS

OTHER RELATED APPLICATIONS

The present application is a continuation-in-part of U.S. patent application Ser. No. 10/626,752, filed on Jul. 25, 2003, now U.S. Pat. No. 6,862,965 which is hereby incorporated by reference.

BACKGROUND OF THE INVENTION

FIELD OF THE INVENTION

The present invention relates to tools, and more particularly, to tools used to facilitate the replacement of brake pads.

BACKGROUND ART

DESCRIPTION OF THE RELATED ART

Many designs for tools have been designed in the past. None of them, however, include curved elongated substantially flat members having wedged ends that mount onto discs or rotors of wheel assemblies, such as motorcycle wheel assemblies, for the replacement of brake pads.

The present invention is an improvement over the invention disclosed and claimed with the above referenced parent application. Other patents describing the closest subject matter provide for a number of more or less complicated features that fail to solve the problem in an efficient and economical way. None of these patents suggest the novel features of the present invention.

SUMMARY OF THE INVENTION

A tool to replace vehicle brake pads, comprising first and second curved elongated substantially flat members each wedged at both ends with connecting means to join to one another when mounted onto each side of a disc or rotor of a wheel assembly. The disc or rotor has a plurality of through-holes. The first and second curved elongated substantially flat members are used for cammingly displacing disc brake pistons into their respective bores to make room for replacement of old brake pads with new brake pads.

The connecting means includes the first curved elongated substantially flat member having a plurality of first protrusions and cavities that align with the through-holes and a corresponding plurality of second protrusions and cavities of the second curved elongated substantially flat member. The plurality of first and second cavities receive the plurality of first and second protrusions to join the first and second curved elongated substantially flat members to one another while mounted onto the each side of the disc or rotor.

The first and second curved elongated substantially flat members each have first and second faces and first and second ends. The first faces are substantially flush and face the each side of the disc or rotor when mounted upon. Each of the second faces having a wedge section at each of the first and second ends extending a predetermined distance from the first and second ends.

While the first and second curved elongated substantially flat members are mounted onto the disc or rotor, the wheel assembly is rotated so that the wedge section slides in between the disc brake pistons and the wheel assembly to cammingly displace the disc brake pistons into their the respective bores with the second faces.

The wheel assembly is rotated in a first direction so that the wedge section slides in between the disc brake pistons and the wheel assembly to cammingly displace the disc brake pistons into their the respective bores with the second faces and rotated in a second direction so that the disc brake pistons remain aligned within the respective bores.

The wheel assembly is of an automobile, motorcycle, truck, tractor, or trailer.

It is therefore one of the main objects of the present invention to provide a tool to replace motorcycle brake pads for back seating disc brake pistons into their bores without having to remove the front or rear wheel assembly.

It is another object of this invention to provide a tool to replace motorcycle brake pads that mounts onto the disc or rotor of a motorcycle wheel assembly.

It is another object of this invention to provide a tool to replace motorcycle brake pads without bending or warping front or rear wheel assemblies.

It is another object of the present invention to provide a tool to replace motorcycle brake pads that comprises a pair of curved elongated substantially flat members wedged at both ends that mount onto either side of wheel assembly disc or rotor.

It is still another object of the present invention to provide a tool to replace motorcycle brake pads that slide in between disc brake pistons and the motorcycle disc, forcing the disc brake pistons into their bores.

It is still another object of the present invention to provide a tool to replace motorcycle brake pads without having to bleed the vehicle's brake line system.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
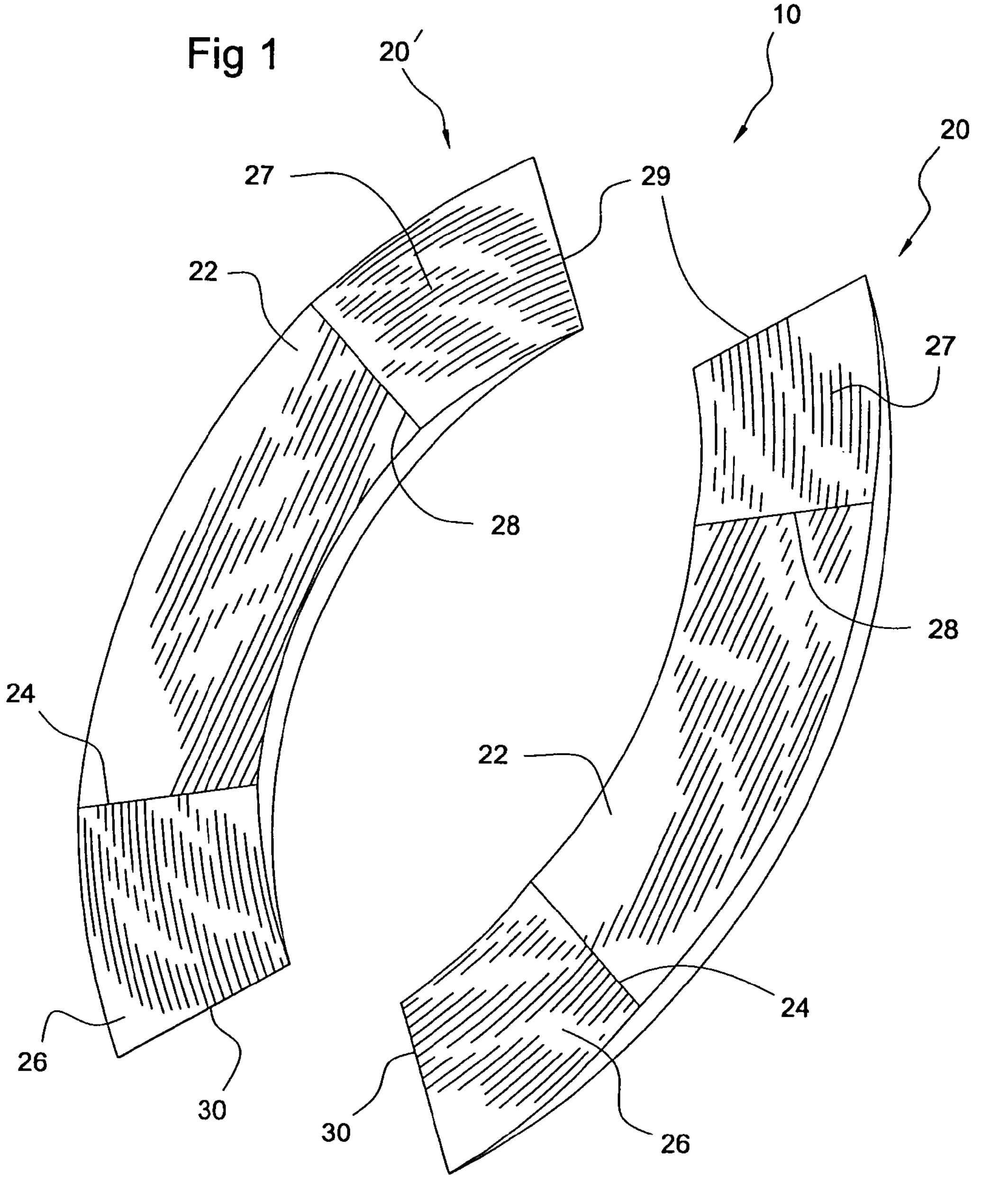
FIG. 1 represents a front perspective view of the present invention.

Referring now to the drawings, where the present invention is generally referred to with numeral 10, it can be observed that it basically includes right elongated member 20 and left elongated member 20'. Right elongated member 20 is mounted onto the right face of a wheel assembly disc or rotor and left elongated member 20' is mounted onto the left face of the wheel assembly disc or rotor. In the preferred embodiment, the wheel assembly is of a "HARLEY DAVIDSON" motorcycle. However, the motorcycle may be any vehicle so long as the vehicle disc or rotor has holes, such as holes 114 seen in FIGS. 3 and 4, for the instant invention to mount upon.

Figure 1A:
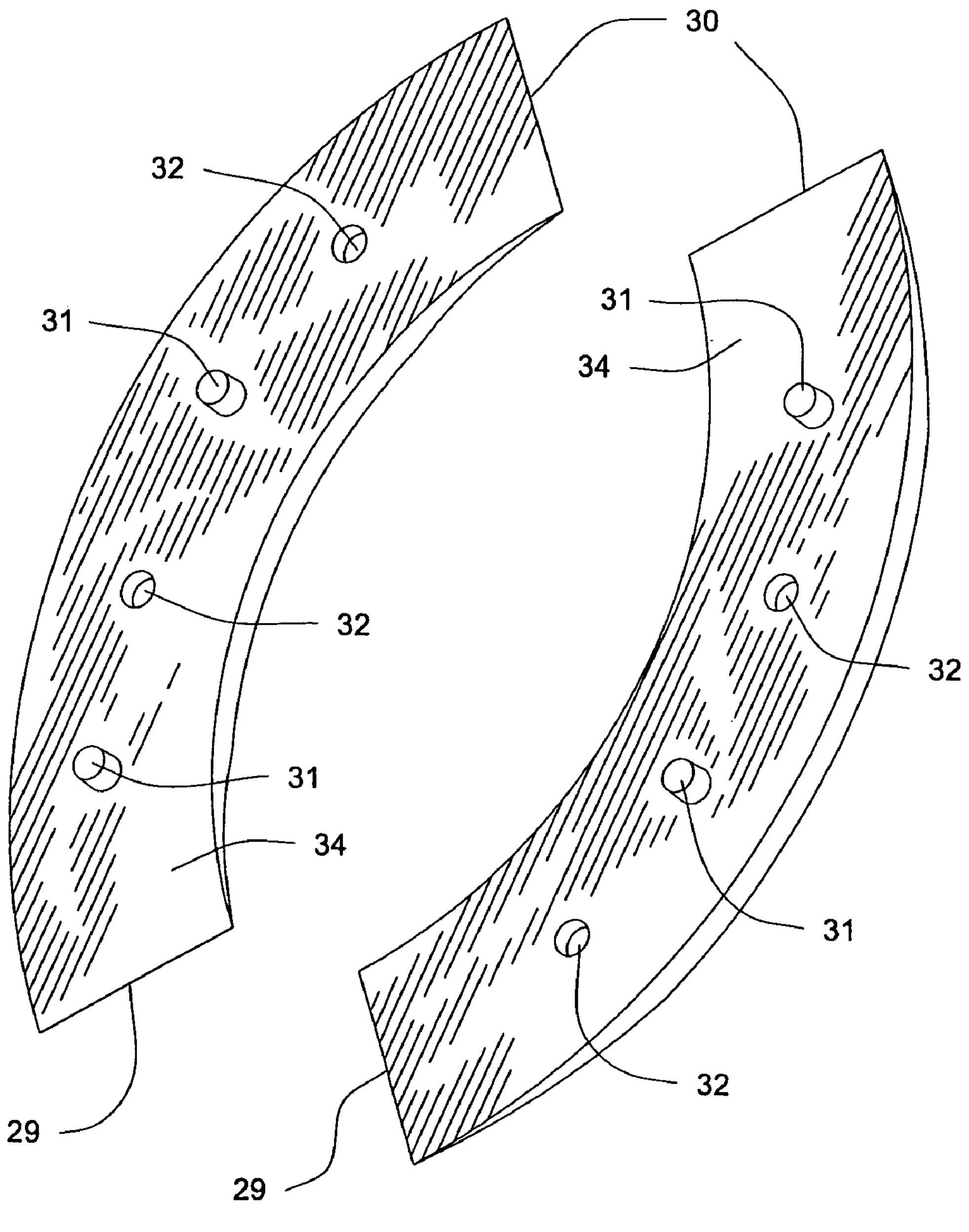
FIG. 1*a* represents a rear perspective view of the present invention.

As seen in FIGS. 1 and 1*a*, right elongated member 20 and left elongated member 20' have cooperative characteristics to mount upon vehicle discs or rotors. Right elongated member 20 and left elongated member 20' are substantially flat; having plateaued section 22 that extends from ridge 28 to ridge 24. Extending from ridge 24 is wedge 26 that terminates at edge 30. Extending from ridge 28 is wedge 27 that terminates at edge 29.

Right elongated member 20 and left elongated member 20' each have protrusions 31 and cavities 32. It is noted that protrusions 31 of right elongated member 20 align with and fit cavities of left elongated member 20', and protrusions 31 of left elongated member 20' align with and fit cavities of right elongated member 20.

Figure 2:
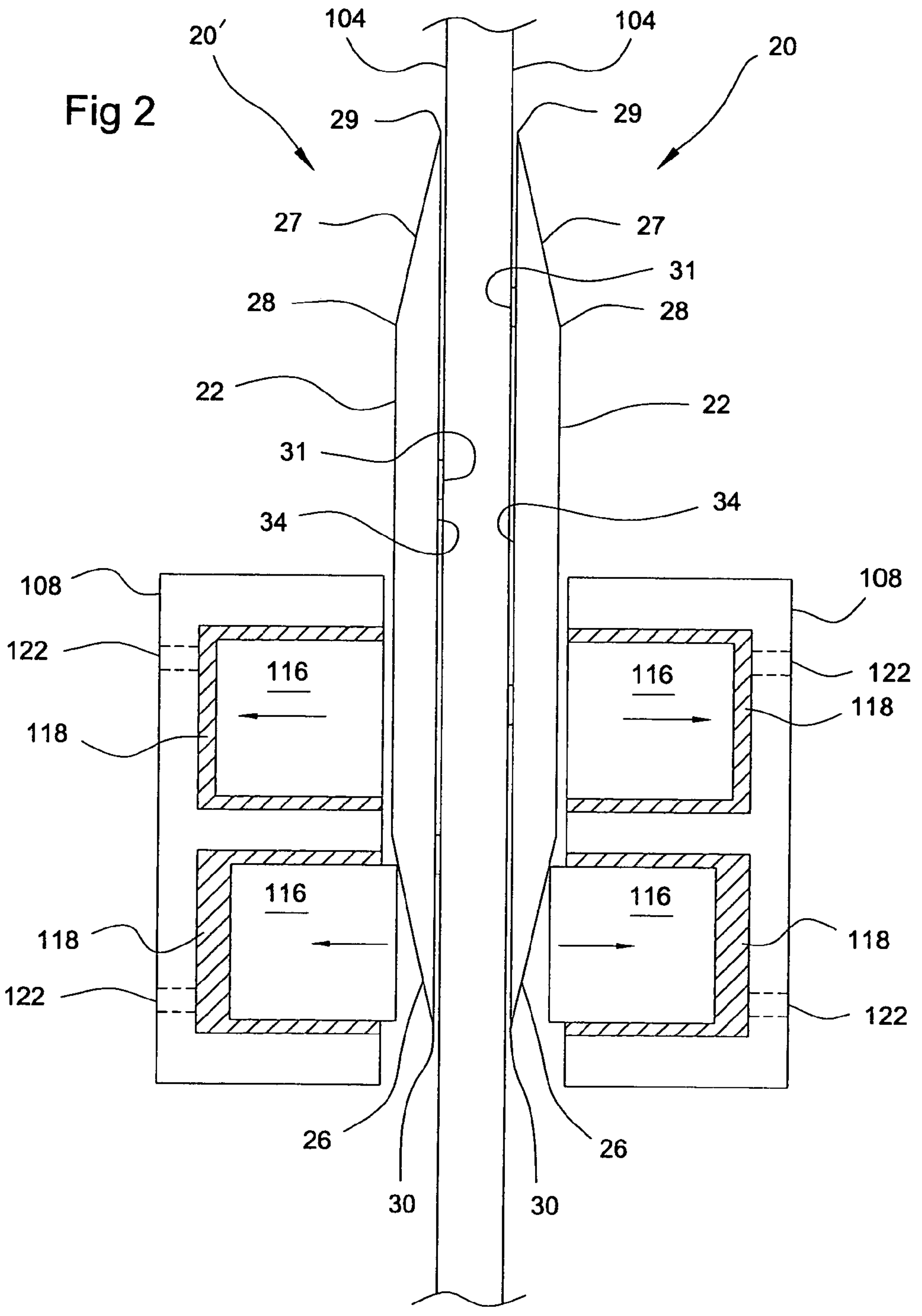
FIG. 2 shows a top view of the instant invention mounted onto the disc or rotor of a wheel assembly and back seating disc brake pistons into their bores.
Figure 3:
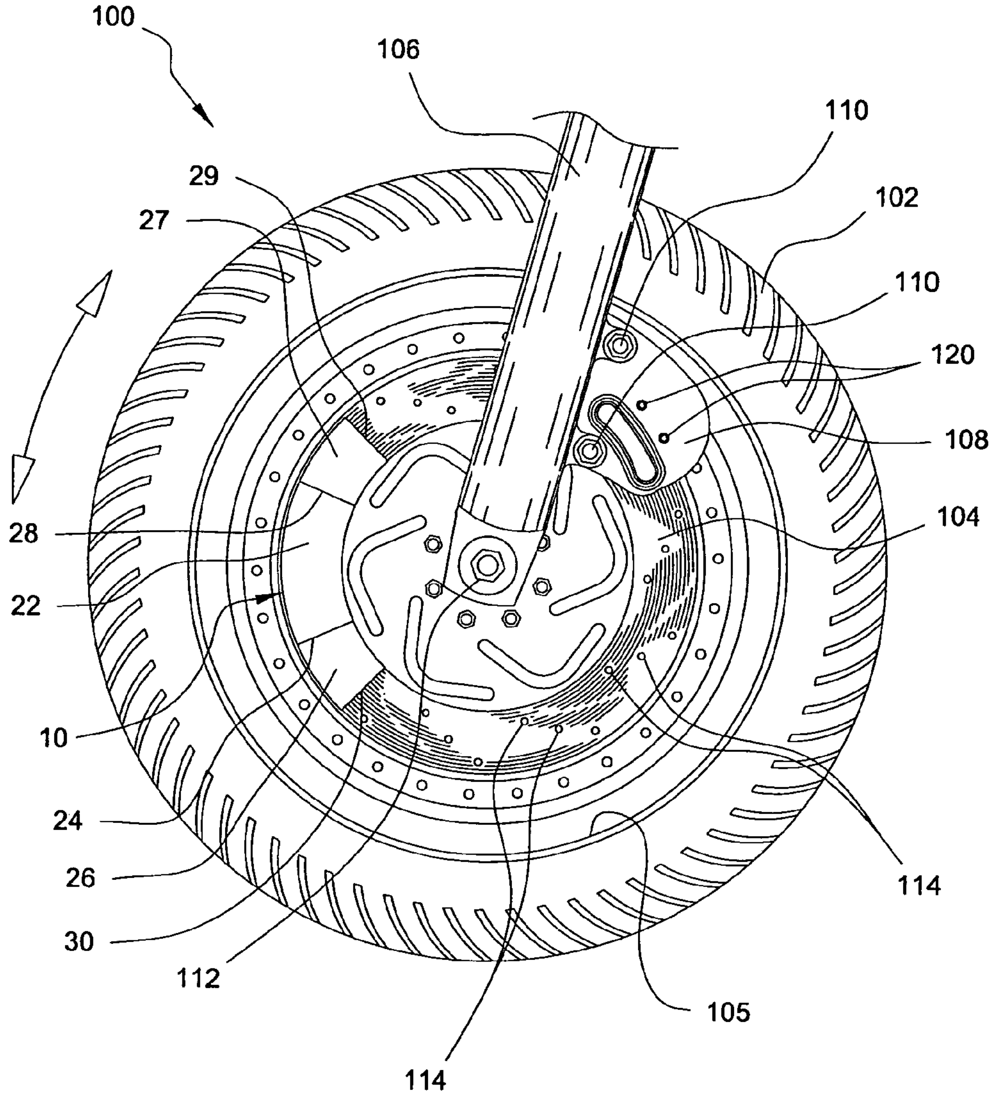
FIG. 3 illustrates a left side view of the instant invention mounted onto a motorcycle disc.
Figure 4:
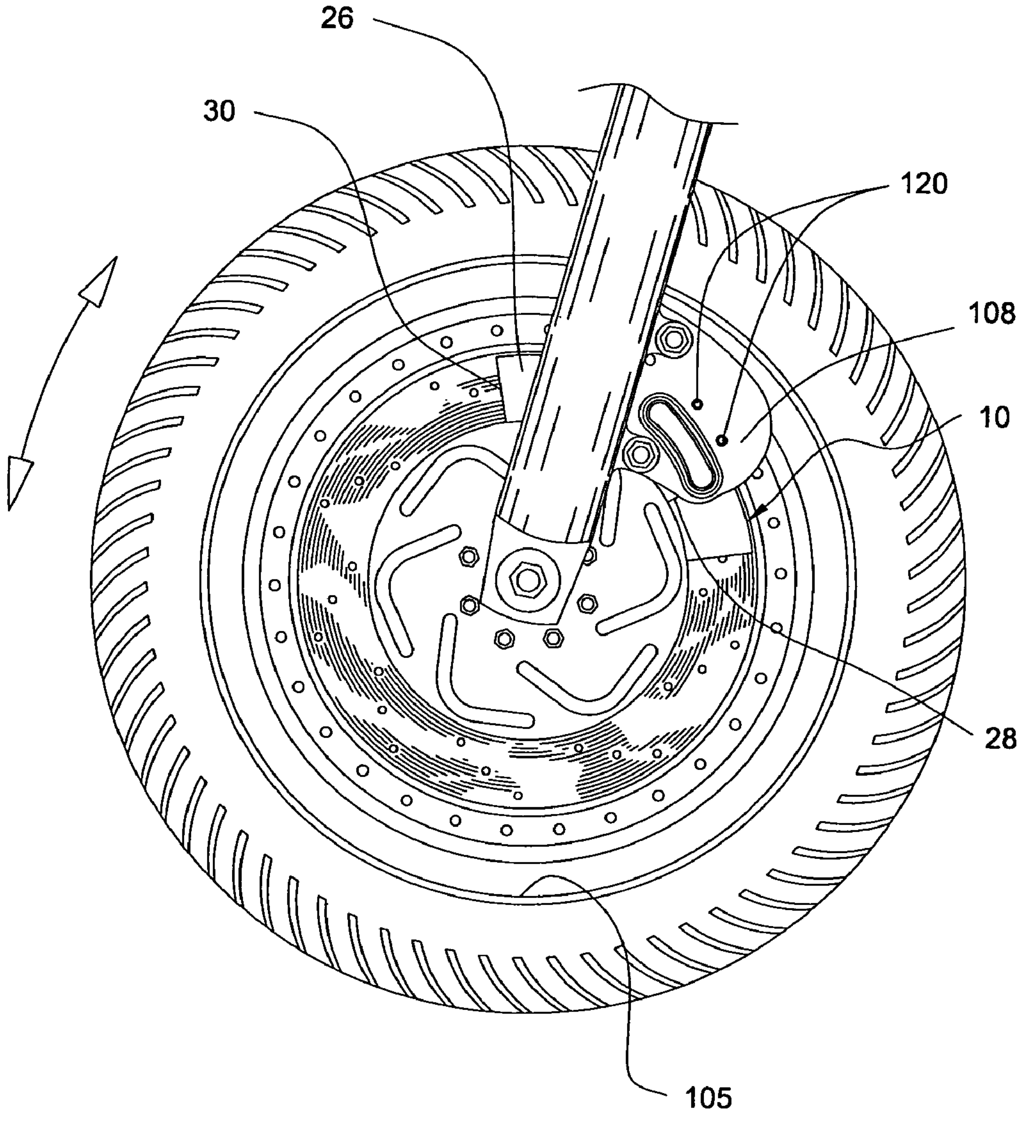
FIG. 4 is a representation of the instant invention having back seated the disc brake pistons into their bores after wheel assembly 100 has rotated in a counter-clockwise direction from the position seen in FIG. 3, forcing the instant invention to slide in between the disc brake pads 116 and the motorcycle disc 104.

As seen in FIG. 2, right elongated member 20 and left elongated member 20' are mounted and secured upon disc 104 of wheel assembly 100, seen in FIGS. 3 and 4. In the preferred embodiment, right elongated member 20 and left elongated member 20' are joined with disc 104 in between them, as shown in the illustrated figure. When mounted and joined upon disc 104, protrusions 31 of right elongated member 20 fill cavities of left elongated member 20', and protrusions 31 of left elongated member 20' fill cavities of right elongated member 20. Flush section 34 faces each face of disc 104 and in the preferred embodiment; the gap between each flush section 34 and disc 104 is as small as possible.

As seen in the illustrated embodiment, brake caliper 108 comprises pistons 116 and their respected bores 118. As shown, wedges 26 cause pistons 116 to back seat into their respective bores 118 as right elongated member 20 and left elongated member 20' pass between disc 104 and pistons 116. Once pistons 116 are set back into their respective bores 118, there is room for the replacement of the old brake pads, not seen. Also seen in FIG. 2, are holes 122 to receive brake pins 120.

Seen in FIG. 3 is a motorcycle wheel assembly and strut. Wheel assembly 100 comprises tire 102 mounted onto rim 105. Disc 104 is secured onto rim 105 and is mounted onto strut 106 by pin 112. Also secured to strut 106 is brake caliper 108. Brake caliper 108 is attached onto strut 106 with end nuts 110. As seen in this illustration, left elongated member 20' is secured onto the left face of disc 104, not shown is right elongated member 20 secured onto the right face of disc 104. In the preferred embodiment, both left elongated member 20' and right elongated member 20 are mounted onto disc 104. This ensures that equal force will be applied to pistons 116 when wedge 26 is forced against them. The instant invention, as seen in the illustrated figure, has been mounted upon disc 104, and is in position to be utilized.

As seen in FIG. 4, wheel assembly 100 has been rotated in a counter-clockwise direction forcing instant invention 10 within brake caliper 108, thus forcing pistons 116 to back seat into their respective bores 118, as seen in FIG. 2. Once pistons 116 are set back into their respective bores 118 there is room for the replacement of the old brake pads, not seen.

In operation, left elongated member 20' is secured onto the left face of disc 104 and right elongated member 20 is secured onto the right face of disc 104, only the left side is seen in FIGS. 3 and 4. Brake pins 120 are removed from brake calipers 108. The removal of brake pins 120 will sometimes cause brake pads, not seen, to slide or fall out completely of brake caliper 108.

In the preferred embodiment, wheel assembly 100 is rotated in a counter-clockwise direction so that edge 30 meets pistons 116 in brake caliper 108, seen in FIG. 2. Instant invention 10 will cause the brake pads, not seen, to slide completely from brake caliper 108, as wheel assembly 100 rotates; in the event they had not slid or fallen out when brake pins 120 were previously removed. Wheel assembly 100 continues to be rotated over the length of plateaued sections 22. It is clear to see that wedge 26 has cleared the length of brake caliper 108. In the illustrated position, plateaued sections 22 have forced pistons 116 to sit back into their respective bores 118, as seen in FIG. 2. Once in the illustrated position, wheel assembly 100 is rotated in a clockwise direction, clearing the area for the installation of new brake pads, not seen. It is noted that before rotating in the clockwise direction, the user may optionally continue rotating wheel assembly 100 until instant invention 10 has cleared brake caliper 108. Then the user may rotate wheel assembly 100 in the clockwise direction. This procedure keeps pistons 116 aligned within their respective bores 118.

In the preferred embodiment, left elongated member 20' and right elongated member 20 are approximately 0.317 inches in thickness from plateaued section 22 to flush section 34. However, thickness of left elongated member 20' and right elongated member 20 may vary according to brake pad thickness and brake caliper tolerances. In some cases left elongated member 20' and right elongated member 20 thickness may range from 0.001 to 10.0 inches and even more, depending on the equipment it is used for, such as but not limited to, automobiles, buses, tractors, and other vehicles having similar brake pad systems. Left elongated member 20' and right elongated member 20 can also vary in length, depending on the number of pistons in the brake caliper.

In addition, the instant invention typically applies even pressure on each side of the wheel assembly disc or rotor, since instant invention 10 mounts on each side of the wheel assembly disc or rotor, preventing bending or warping of the wheel assembly disc or rotor.

The instant invention may be utilized to safely replace old vehicle brake pads without opening the brake line system. Therefore, it is not necessary to bleed the brake line system. Furthermore, the instant invention may be used to replace brake pads on front or rear wheel assemblies.

Furthermore, the instant invention may be utilized in areas of limited workspace. In operation, once the invention is in place upon the disc or rotor, the motorcycle may be pushed forward then backward, thus clearing the area for the installation of new brake pads. This may be accomplished without having to lift the motorcycle with a lift.

The instant invention may be used as a handy travel tool for easy replacement of brake pads or to adjust bake fluid pressure. In most cases when replacing brake pads, especially with "HARLEY DAVIDSON" motorcycles, it is often necessary to remove accessories such as saddlebags, exhausts, or even the entire wheel assembly. Utilization of the instant invention allows the mechanic or user to not have to perform those unnecessary steps to replace brake pads.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A tool to replace vehicle brake pads, comprising first and second curved elongated substantially flat members each wedged at both ends with connecting means to join to one another when mounted onto each side of a disc or rotor of a wheel assembly, said disc or rotor having a plurality of through-holes, said first and second curved elongated substantially flat members used for cammingly displacing disc brake pistons into their respective bores to make room for replacement of old brake pads with new brake pads.

2. The tool to replace vehicle brake pads set forth in claim 1, further characterized in that said connecting means includes said first curved elongated substantially flat member having a plurality of first protrusions and cavities that align with said through-holes and a corresponding plurality of second protrusions and cavities of said second curved elongated substantially flat member, said plurality of first and second cavities receiving said plurality of first and second protrusions to join said first and second curved elongated substantially flat members to one another while mounted onto said each side of said disc or rotor.

3. The tool to replace vehicle brake pads set forth in claim 2, further characterized in that said first and second curved elongated substantially flat members each have first and second faces and first and second ends, said first faces substantially flush and face said each side of said disc or rotor when mounted upon, each of said second faces having a wedge section at each of said first and second ends extending a predetermined distance from said first and second ends.

4. The tool to replace vehicle brake pads set forth in claim 3, further characterized in that when said first and second curved elongated substantially flat members are mounted onto said disc or rotor, said wheel assembly is rotated so that said wedge section slides in between said disc brake pistons and said wheel assembly to cammingly displace said disc brake pistons into their said respective bores with said second faces.

5. The tool to replace vehicle brake pads set forth in claim 4, further characterized in that said wheel assembly is rotated in a first direction so that said wedge section slides in between said disc brake pistons and said wheel assembly to cammingly displace said disc brake pistons into their said respective bores with said second faces and rotated in a second direction so that said disc brake pistons remain aligned within said respective bores.

6. The tool to replace vehicle brake pads set forth in claim 5, further characterized in that said wheel assembly is of an automobile, motorcycle, truck, tractor, or trailer.

* * * * *